(12) United States Patent
Zhang et al.

(10) Patent No.: US 10,647,377 B2
(45) Date of Patent: May 12, 2020

(54) FOLDABLE VEHICLE

(71) Applicant: SHENZHEN RELYNC TECH LTD., Shenzhen (CN)

(72) Inventors: Jianhui Zhang, Shenzhen (CN); Yongwei Wang, Shenzhen (CN); Gaojia Cai, Shenzhen (CN); Chaoxiang Huang, Shenzhen (CN); Gang Wang, Shenzhen (CN)

(73) Assignee: SHENZHEN RELYNC TECH LTD., Shenzhen (CN)

( * ) Notice: Subject to any disclaimer, the term of this patent is extended or adjusted under 35 U.S.C. 154(b) by 174 days.

(21) Appl. No.: 15/890,327

(22) Filed: Feb. 6, 2018

(65) Prior Publication Data

US 2018/0162480 A1 Jun. 14, 2018

Related U.S. Application Data

(63) Continuation-in-part of application No. PCT/CN2017/096615, filed on Aug. 9, 2017, which
(Continued)

(30) Foreign Application Priority Data

Aug. 10, 2016 (CN) .......................... 2016 1 0652123
Aug. 10, 2016 (CN) ...................... 2016 2 0862891 U

(51) Int. Cl.
*B62K 15/00* (2006.01)
*B62K 3/00* (2006.01)
(52) U.S. Cl.
CPC ............ *B62K 15/008* (2013.01); *B62K 3/002* (2013.01); *B62K 15/00* (2013.01); *B62K 2206/00* (2013.01)

(58) Field of Classification Search
None
See application file for complete search history.

(56) References Cited

U.S. PATENT DOCUMENTS 6,520,525 B1 * 2/2003 Yoon ...................... B62K 3/002
280/221
6,616,154 B1 * 9/2003 Neuhold ................ B62K 3/002
280/87.05
(Continued)

FOREIGN PATENT DOCUMENTS

CN 2711023 Y 7/2005
CN 103387028 A 11/2013
(Continued)

*Primary Examiner* — Joseph M Rocca
*Assistant Examiner* — Harold Eric Pahlck, III
(74) *Attorney, Agent, or Firm* — Im IP Law; Chai Im; C. Andrew Im

(57) ABSTRACT

A foldable vehicle includes head and chassis assemblies hinged together, and a foldable vehicle lock. The head assembly includes upper and lower heads hinged together. The chassis assembly includes front and rear chassis hinged together. A foldable linkage folds and unfolds the foldable vehicle. The foldable linkage is hinged with the head assembly, the front and rear chassis such that the head assembly, the front and rear chassis are driven to conduct relative movement to perform the corresponding foldable and unfoldable operations. The foldable vehicle lock includes a head locking assembly to lock the upper head with the lower head, a chassis locking assembly to lock the front chassis with the rear chassis, and a whole vehicle locking assembly to lock the head assembly with the chassis assembly. The chassis and whole vehicle locking assemblies are controlled synchronously by a linkage controller.

20 Claims, 28 Drawing Sheets

Related U.S. Application Data is a continuation-in-part of application No. PCT/CN2017/096612, filed on Aug. 9, 2017.

(56) References Cited

U.S. PATENT DOCUMENTS

| | | | | |
|---|---|---|---|---|
| 7,926,606 | B2* | 4/2011 | Wang | B62K 15/008 |
| | | | | 180/208 |
| 7,967,095 | B2* | 6/2011 | Kosco | B62K 5/025 |
| | | | | 180/208 |
| 8,191,920 | B2* | 6/2012 | Zhang | B62B 3/02 |
| | | | | 280/47.26 |
| 8,801,009 | B2* | 8/2014 | Sapir | B62K 15/008 |
| | | | | 280/87.05 |
| 8,876,128 | B2* | 11/2014 | Moldestad | B62K 15/008 |
| | | | | 280/40 |
| 9,265,675 | B2* | 2/2016 | Ransenberg | B62K 15/008 |
| 9,302,691 | B2* | 4/2016 | Cheng | B62B 3/02 |
| 9,457,865 | B2* | 10/2016 | Gerencser | B62K 15/008 |
| 9,708,025 | B2* | 7/2017 | Lee | B62K 11/02 |
| 10,150,528 | B2* | 12/2018 | Kano | B62K 5/06 |
| 10,322,767 | B2* | 6/2019 | Dragomir | B62K 3/002 |
| 10,336,395 | B2* | 7/2019 | Li | B62K 21/02 |
| 2012/0080859 | A1* | 4/2012 | Tai | B62K 3/002 |
| | | | | 280/87.041 |
| 2017/0066496 | A1* | 3/2017 | Ochner | B62K 3/002 |
| 2017/0158279 | A1* | 6/2017 | Xie | B62J 1/002 |
| 2018/0186423 | A1* | 7/2018 | Koo | B62K 3/002 |
| 2019/0023347 | A1* | 1/2019 | Block | B62K 5/025 |
| 2019/0241230 | A1* | 8/2019 | Zhang | B62K 5/007 |

FOREIGN PATENT DOCUMENTS

| | | |
|---|---|---|
| CN | 103387029 A | 11/2013 |
| CN | 102700663 B | 6/2014 |
| CN | 104309747 A | 1/2015 |
| CN | 105253232 A | 1/2016 |
| CN | 105314029 A | 2/2016 |
| CN | 105480354 A | 4/2016 |
| CN | 106184552 A | 12/2016 |
| CN | 106184553 A | 12/2016 |
| CN | 205931110 U | 2/2017 |
| CN | 104276242 B | 4/2017 |
| WO | 99/00290 A1 | 1/1999 |

* cited by examiner

FOLDABLE VEHICLE

RELATED APPLICATIONS

The present application is a continuation-in-part application of the international application PCT/CN017/096615 filed Aug. 9, 2017, which claims the benefit of the Chinese application CN01610652123.2 filed Aug. 10, 2016, and the international application PCT/CN017/096612 filed Aug. 9, 2017, which claims the benefit of the Chinese application CN01620862891.6 filed Aug. 10, 2016, each of which is incorporated herein by reference in its entirety.

FIELD OF THE INVENTION

The present invention relates to the technical field of foldable vehicle, more particularly, to a foldable vehicle having a foldable linkage foldable and a foldable vehicle lock.

BACKGROUND OF THE INVENTION

With the progress of society and the development of city, young people living in cities are in dire need of a short-trip tool that can replace walking from the subway or bus station to destinations such as company. Electric scooters have been developed for a long time; for the elderly, people with mobility problems, and those who need to travel a short trip, it is indeed a good means of transport. Although the two-wheeled scooters have the advantages of small size, light weight and simple structure, most of the two-wheeled scooters are driven by standing on them to cause the problem that as the center of gravity is high, it will overturn when braked in emergency, and standing on it makes people uncomfortable while the posture is not graceful. Therefore, a three-wheeled electric vehicle capable of running stably at low speed has been widely used.

Now, in order to improve the portability of a foldable vehicle so that it can be carried into a public transportation system such as a subway or a public bus, in prior art the foldable vehicle is usually designed as a multi-part structure, which is deployed and fixed in use and folded when not in use.

At present, the foldable vehicle is divided into two forms: for one form, the chassis is not folded, only the head and chassis are folded, and the volume for this type of foldable vehicle is still relatively large after foldable, which is common in two-wheeled foldable, similar to the scooter, small electric car; another form is the front chassis and the rear chassis fold, the front and the chassis fold, the existing three-wheeled scaffoldable foldable mechanism is usually used in this form, foldable steps tedious, there is no linkage between the body and the lock Tight institutions are located further away, resulting in more than one step required to complete the fold.

For example, in a vehicle disclosed in an application of No. CN01310113606.1, there is no linkage mechanism among the head, front chassis, rear chassis, so users need to perform two steps to complete the deployment or foldable. Another example is a commercially available electric tricycle, wherein a supporting rod is arranged between the head and chassis, is hinged to the head at one end and is slidably cooperated with the chassis at another end; the supporting rod is arranged with a sliding block, the chassis is arranged with a locking rod hinged with the sliding block and the locking rod is arranged with a hook cooperated with the sliding block, thus the hook is hanged on the sliding block when in locking state while being separated from the block when not in locking state to achieve unlocking the head with the chassis; however, there is no foldable between the front chassis and the rear chassis and not any unlocking structures, so that the user needs to bend to unlock the head and the chassis and then turn around to lift the hinges of the front chassis and the rear chassis to achieve the foldable of the entire vehicle. And in another commercially available electric vehicle, the head is folded with the chassis and the front chassis is locking with the rear chassis by applying a foldable device and a locking member respectively, in other words, one end of the cable is fixed on the fixed block and another end is fixed on the unlocking handle; a sliding groove is arranged on the head, the lower end of the fixed block slides linearly relative to the head, a return spring is arranged between the block and the head, the fixed block has tooth on the end that are cooperated with the slot of the chassis; when the unlocking handle is pulled, the cable pulls the fixed block to withdraw the fixed block from the chassis slot for unlocking the head from the chassis; on the contrary, under the action of the return spring, the tooth of the fixed block is stuck in the tooth groove while the foldable device acting between the head and the chassis, between the front and rear chassis respectively without any linkage structure, then users need to bend twice to drive the foldable device to operate, thereby making tedious operation and causing a remote position for operation.

In the meantime, since the number of times for foldable affects the volume after foldable and the existing foldable vehicle adopts as many foldable times as possible, for example foldable starts from the seats until the whole vehicle is folded through linkage, this puts a higher requirement on the locking performance after foldable. The increase in the foldable times leads to the more complicated locking mechanism and then causes the parts to be bulky and become multi-structurally, and multiple locking positions are required during foldable or unfoldable, therefore, the more the foldable times, the more complicated the locking structure, the worse the stability of the mechanism and the higher the failure rate in the later stage, further causing the operation of locking and unlocking to be complicated. As disclosed in the application of CN01520185150.4, a linkage foldable structure for foldable seat backrest, in order to reduce the folded volume, adopts as many foldable times as possible, thus leading to a complicated hinge structure.

OBJECTS AND SUMMARY OF THE INVENTION

One purpose of the present invention is to provide a foldable vehicle, and steps of foldable, deploying can be simplified by arranging a foldable linkage and a foldable vehicle lock on the foldable vehicle, thus further simplifying the operation time.

To achieve this purpose, the present invention employs the following technical solutions:

A foldable vehicle is provided to comprise a head assembly and a chassis assembly that are hinged together, the head assembly including an upper head and a lower head that are hinged together, and the chassis assembly includes a front chassis and a rear chassis that are hinged together, the foldable vehicle being provided with a foldable linkage used to fold and unfold the foldable vehicle, the foldable linkage being hinged with the head assembly, the front chassis and the rear chassis such that the head assembly, the front chassis and the rear chassis are driven to conduct relative movement for achieving corresponding foldable and unfoldable operations; the foldable vehicle further comprises a foldable vehicle lock, the foldable vehicle lock including a head locking assembly used to achieve locking the upper head with the lower head after foldable, a chassis locking assembly used to achieve locking the front chassis with the rear chassis after foldable and a whole vehicle locking assembly used to achieve locking the head assembly with the chassis assembly after foldable, the chassis locking assembly and the whole vehicle locking assembly being controlled synchronously by a linkage controller.

As a preferred technical solution for the foldable vehicle, the head locking assembly includes a head latch hook arranged on the upper head or the lower head and a head bottom buckle arranged on the upper head or the lower head corresponding to the head latch hook, wherein the head latch hook is arranged symmetrically with the head bottom buckle relative to a hinge axis of the upper head and the lower head.

As a preferred technical solution for the foldable vehicle, the head latch hook includes a head latch hook body and an elastic connector used for connecting the head latch hook body with the foldable vehicle, wherein the head latch hook body is swingable relative to the foldable vehicle under the connection of the elastic connector.

As a preferred technical solution for the foldable vehicle, the head latch hook body includes a head hook facing the head bottom buckle and a head unlocking button arranged on one end of the head latch hook body away from the head hook, wherein the head unlocking button can control the swing of the head latch hook body.

As a preferred technical solution for the foldable vehicle, the upper head is provided with a group of magnets and the lower head with a group of magnets, wherein the two groups of magnets are symmetrically arranged relative to the hinge axis of the upper and lower head and can be attracted to each other when the upper head moves close to the lower head.

As a preferred technical solution for the foldable vehicle, the chassis locking assembly includes a chassis latch hook, a chassis locking buckle corresponding to the chassis latch hook, an elastic support used to push the chassis latch hook to move towards the chassis locking buckle; the whole vehicle locking assembly includes a whole vehicle latch hook, a whole vehicle locking buckle corresponding to the whole vehicle latch hook, an elastic support used to push the whole vehicle latch hook to move towards the whole vehicle locking buckle.

As a preferred technical solution for the foldable vehicle, the chassis latch hook includes a chassis latch hook body hinged on the rear chassis, and the elastic support is arranged at one end of the chassis latch hook body to push the chassis latch hook body to rotate around the hinge axis while the other end of the chassis latch hook body is connected with a linkage unlocking rod; the whole vehicle latch hook includes a whole vehicle latch hook body hinged on the rear chassis, and the elastic support is arranged at one end of the whole vehicle latch hook body to push the whole vehicle latch hook body to rotate around the hinge axis while the other end of the whole vehicle latch hook body is connected with the linkage unlocking rod; the linkage unlocking rod synchronously controls the chassis latch hook body and the whole vehicle latch hook body.

As a preferred technical solution for the foldable vehicle, the top of the linkage unlocking rod is connected with an unlocking control rod and the unlocking control rod is arranged with a return spring capable of allowing the unlocking control rod to automatically regroup after being pressed.

As a preferred technical solution for the foldable vehicle, the unlocking control rod has an annular boss thereon and the rear chassis is arranged with a first control rod mounting plate and a second control rod mounting plate that are parallel to each other; the return spring is sleeved on the unlocking control rod, and both the return spring and the annular boss are positioned between the first control rod mounting plate and the second control rod mounting plate; the return spring is arranged at one side of the annular boss adjacent to the linkage unlocking rod.

As a preferred technical solution for the foldable vehicle, that an end connecting the unlocking control rod with the linkage unlocking rod is arranged with a threaded hole, and the linkage unlocking rod is in threaded connection with the unlocking control rod.

As a preferred technical solution for the foldable vehicle, the chassis latch hook includes a chassis latch hook body and the whole vehicle latch hook includes a whole vehicle latch hook body, wherein the chassis latch hook body is securely connected with the whole vehicle latch hook body and is slidably connected with the rear chassis.

As a preferred technical solution for the foldable vehicle, the chassis latch hook body is integrally formed with the whole vehicle latch hook body, and the chassis latch hook body and/or the whole vehicle latch hook is slidably connected with the rear chassis by a latch hook sliding base.

As a preferred technical solution for the foldable vehicle, the elastic support includes a latch hook return spring arranged on the latch hook sliding base and a latch hook sliding guide post arranged within latch hook return spring; the whole vehicle latch hook is arranged with a fixed resilient tab and a resilient tab return spring, wherein the fixed resilient tab can be rotatably connected with the resilient tab return spring and the resilient tab return spring is used for resetting the fixed resilient tab when it rotates to a predetermined angle to secure the chassis latch hook body with the whole vehicle latch hook body.

As a preferred technical solution for the foldable vehicle, the chassis latch hook further includes an unlocking button arranged in the chassis latch hook body or the whole vehicle latch hook body further includes an unlocking button arranged in the whole vehicle latch hook body, wherein the head unlocking button can control the sliding of the chassis latch hook body and the whole vehicle latch hook body.

As a preferred technical solution for the foldable vehicle, the foldable linkage includes a first linkage assembly with both ends hinged with the head assembly and the front chassis respectively and a second linkage assembly hinged with the first linkage assembly and the rear chassis, wherein the second linkage assembly can be driven to move by controlling the movement of the rear chassis and can drive the first linkage assembly to move.

As a preferred technical solution for the foldable vehicle, the first linkage assembly includes a first link and a second link that are hinged together, wherein one end of the first link away from the second link is hinged with the head assembly and one end of the second link away from the first link is hinged with the front chassis.

As a preferred technical solution for the foldable vehicle, the second linkage assembly includes a third link and a fourth link that are hinged together, wherein one end of the third link away from the fourth link is hinged at the position of the second link adjacent to the first link and one end of the fourth link away from the third link is hinged with the rear chassis.

As a preferred technical solution for the foldable vehicle, one end of the rear chassis adjacent to the front chassis is arranged with a hinge connection member and the fourth link is hinged with the rear chassis by the hinge connection member.

As a preferred technical solution for the foldable vehicle, the front chassis is arranged with a slider capable of sliding relative to the front chassis, and the third link and the fourth link are hinged with the slider by a common hinge axis.

As a preferred technical solution for the foldable vehicle, the front chassis is arranged with a sliding slot and the slider is a sliding block arranged slidably in the sliding slot.

As a preferred technical solution for the foldable vehicle, a handle is arranged on the rear chassis and adjacent to the hinged position of the rear chassis and the front chassis, and the handle is hinged with the rear chassis.

As a preferred technical solution for the foldable vehicle, a deployment fixing groove is arranged at both ends of the handle and adjacent to the one side of the rear chassis and the front chassis is arranged with a stop block at a position corresponding to the deployment fixing groove; the stop block abuts against the handle at the deployment fixing groove when the foldable vehicle is in an unfoldable state.

As a preferred technical solution for the foldable vehicle, the foldable linkage has two groups and symmetrically arranged on both sides of the foldable vehicle.

The beneficial effects of the present invention are: arranging the head locking assembly can lock the upper head with the lower head after foldable and arranging the chassis locking assembly can lock the front chassis with the rear chassis after foldable so as to reduce the volume after foldable, and further arranging the whole vehicle locking assembly to lock the head assembly with the chassis assembly can achieve the locking of all vehicle, thus ensuring the stability for the foldable of vehicle body; through arranging the foldable linkage and the linkage of foldable linkage during the foldable and deployment of foldable vehicle, the relative movement of all positions in the foldable vehicle can be achieved by one-step controlling using the stability for the movement of linkage mechanism and the movement conversion and linkage movement characteristics among links, thereby further completing foldable, deployment in a simple manner; at the same time, the linkage controller is used to control the chassis locking assembly and the vehicle locking assembly in an interlocking manner, so that the two-stepped unlocking is achieved through one-stepped control to simplify the unlocking operation, causing the vehicle to fold and unfoldable easily and greatly reducing the difficulty of operating the foldable vehicle so as to improve the user experience of the foldable vehicle. Arranging the head locking assembly can lock the folded upper head with the folded lower head, and through the combination of the head locking assembly and the linkage controller, the head locking assembly and the linkage controller need to control the locking, the unlocking and the movement between the head assembly, the chassis assembly and the front and rear chassis synchronously, so that the linkage operation among the foldable operations of the foldable vehicle is achieved. Compared with prior art, above solution not only reduces the operation difficulty of the foldable vehicle on condition that the volume of the foldable vehicle after foldable is reduced, but also ensures the stability of the foldable vehicle by the linkage mechanism with a simple and stable structure, thereby reducing the failure rate in the later period.

In particular, the pressure angle is exactly equal to 90° when the handle and the stop block are pressed against each other through arranging the deployment fixed groove and stop block, and the front chassis and the rear chassis are locked in the dead center position.

Further, compared with the multi-linkage used for foldable a plurality of parts in prior art, the foldable linkage greatly simplifies the structure of foldable vehicle and improves the structural stability of this vehicle to enhance the stability of foldable operations by realizing the linkage relationship among the head assembly, the front and rear chassis using four-linkage mechanism; through the buckle position provided on the head assembly, and the fixedly-connected chassis latch hook body and whole vehicle latch hook body arranged on the rear chassis to slide simultaneously lock the corresponding buckles, so that the locking and unlocking between the head assembly and the chassis assembly, the front and rear chassis are controlled synchronously. Compared with prior art, above-mentioned two sets of unlocking operations share a common step so as to simplify the operation process.

BRIEF DESCRIPTION OF FIGURES

The invention will be further described in detail in combination with drawings and the embodiment.

In the drawings.

Figure 1:
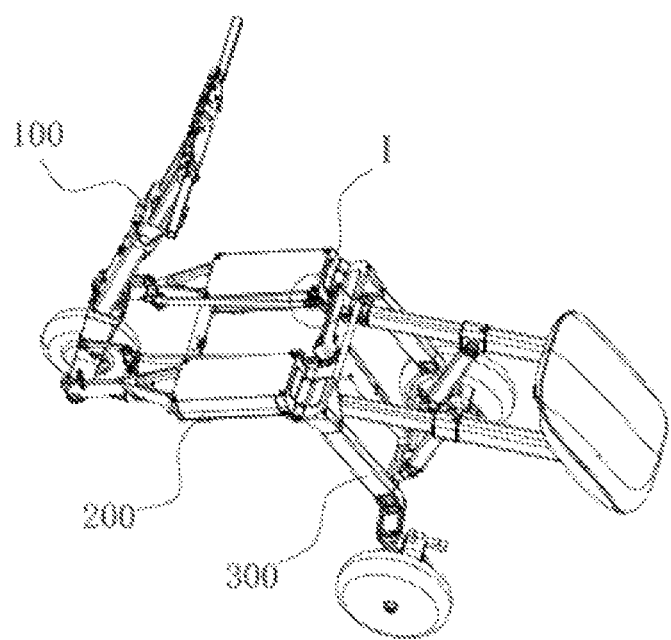
FIG. 1 is a three-dimensional structure diagram of the foldable vehicle according to embodiments.
Figure 2:
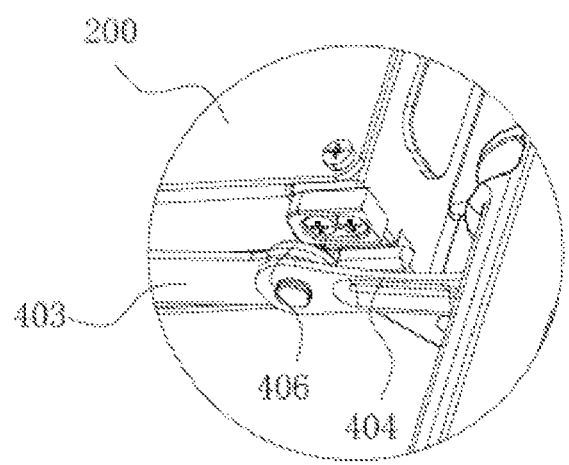
FIG. 2 is an enlarged view of I in FIG. 1.
Figure 3:
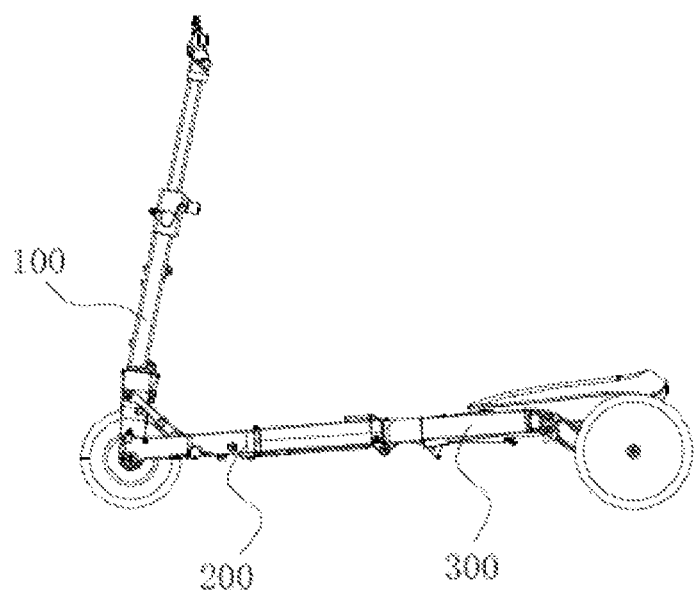
FIG. 3 is a side schematic view for the deployment state of the foldable vehicle according to embodiments.
Figure 4:
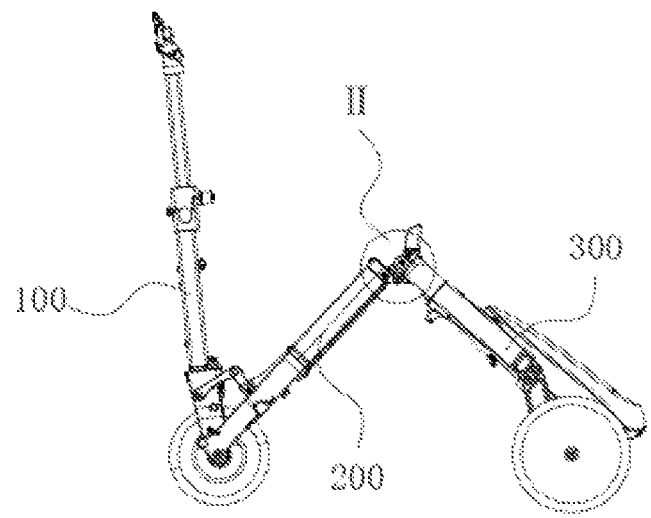
FIG. 4 is a side schematic view for the intermediate state during the foldable of the foldable vehicle according to embodiments.
Figure 5:
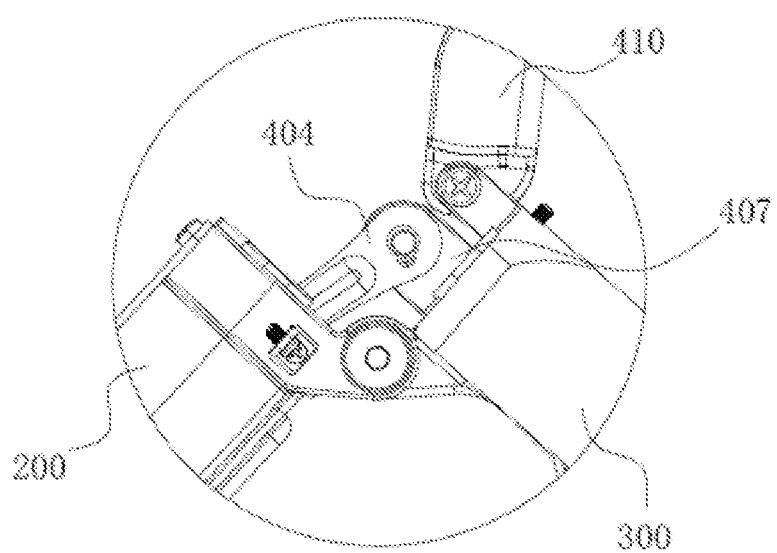
FIG. 5 is an enlarged view of II in FIG. 4.
Figure 6:
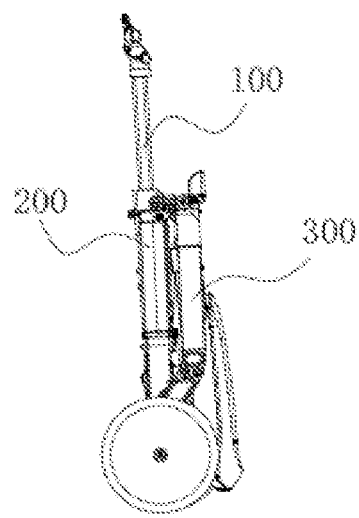
FIG. 6 is a side schematic view for the foldable state of the foldable vehicle according to embodiments.
Figure 7:
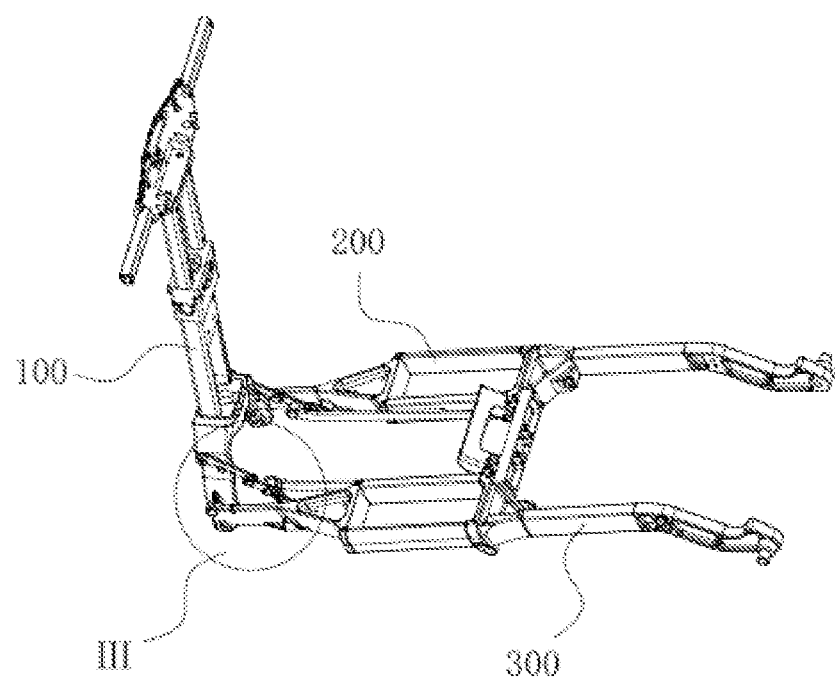
FIG. 7 is a three-dimensional structure diagram for the deployment state of the foldable vehicle according to embodiments.

100. Head assembly; 110. Upper head; 111. Head latch hook body; 112. Elastic connector; 113. Head unlocking button; 120. Lower head; 121. Head bottom buckle; 122. Whole vehicle locking buckle; 200. Front chassis; 201. Chassis locking buckle; 300. Rear chassis; 301. Chassis latch hook body; 302. Elastic support; 303. Whole vehicle latch hook body; 304. Linkage unlocking rod; 305. Support member mounting plate; 306. Unlocking control rod; 307. Return spring; 308. Latch hook sliding base; 309. Linkage button unlocking; 310. Latch hook return spring; 311. Latch hook sliding guide post; 312. Fixed resilient tab; 313. Resilient tab return spring; 401. First link; 402. Second link; 403. Third link; 404. Fourth link; 405. Sliding slot; 406. Sliding block; 407. Hinge connection member; 408. Deployment fixing groove; 409. Stop block; 410. Handle.

DETAILED DESCRIPTION OF THE EMBODIMENTS

In the description of the present invention, it should be noted, unless noted otherwise that, orientation or relationship between positions designated by "inside", "outside" is intended for convenience of description and simplification of description, not to designate or suggest that the designated device or element must have a particular orientation, configure or operate in a particular orientation, thus it should not be considered a limitation of the present invention.

Moreover, terms like "first", "second", "third", "fourth" etc. are only used for description, not be considered as a designation or designation of relative importance or implication of indicating the number of technical features. Thus, features defined as "first", "second", "third", "fourth" may explicitly or implicitly include one or more of the features.

In the description of the present invention, terms like "arranged", "connected", "fixed" should be comprehended broadly unless otherwise specifically limited, for example, it may be connected securely, also be connected removably or integrally; it may be coupled mechanically, also be coupled electrically; it may be connected directly, also through a medium indirectly. The specific meaning of the terms in the present invention may be understood by those of ordinary skill in the art due to certain situations.

The technical scheme of the present invention will be further described in detail in combination with drawings and the specific embodiments.

As shown in FIGS. 1-28, in the present embodiment, a foldable vehicle according to the present invention comprises a head assembly 100 and a chassis assembly that are hinged together, the head assembly 100 including an upper head 110 and a lower head 120 that are hinged together, and the chassis assembly includes a front chassis 200 and a rear chassis 300 that are hinged together, the foldable vehicle being provided with a foldable linkage used to fold and unfold the foldable vehicle, the foldable linkage being hinged with the head assembly 100, the front chassis 200 and the rear chassis 300 such that the head assembly 100, the front chassis 200 and the rear chassis 300 are driven to conduct relative movement for achieving corresponding foldable and unfoldable operations; the foldable vehicle further comprises a foldable vehicle lock, the foldable vehicle lock including a head locking assembly used to achieve locking the upper head with the lower head after foldable, a chassis locking assembly used to achieve locking the front chassis with the rear chassis after foldable and a whole vehicle locking assembly used to achieve locking the head assembly with the chassis assembly after foldable, the chassis locking assembly and the whole vehicle locking assembly being controlled synchronously by a linkage controller.

The foldable vehicle further comprises a foldable vehicle lock, the foldable vehicle lock including a head locking assembly used to achieve locking the upper head 110 with the lower head 120 after foldable, a chassis locking assembly used to achieve locking the front chassis 200 with the rear chassis 300 after foldable and a whole vehicle locking assembly used to achieve locking the head assembly with the chassis assembly after foldable, the chassis locking assembly and the whole vehicle locking assembly being controlled synchronously by a linkage controller.

Arranging the head locking assembly can lock the upper head 110 with the lower head 120 after foldable and arranging the chassis locking assembly can lock the front chassis 200 with the rear chassis 300 after foldable, and further arranging the whole vehicle locking assembly to lock the head assembly 100 with the chassis assembly can achieve the locking of all vehicle, thus ensuring the stability for the foldable of vehicle body; through arranging the foldable linkage and the linkage of foldable linkage during the foldable and deployment of foldable vehicle, the relative movement of all positions in the foldable vehicle can be achieved by one-step controlling using the stability for the movement of linkage mechanism and the movement conversion and linkage movement characteristics among links, thereby further completing foldable, deployment in a simple manner; at the same time, the linkage controller is used to control the chassis locking assembly and the vehicle locking assembly in an interlocking manner, so that the two-stepped unlocking is achieved through one-stepped control to simplify the unlocking operation, causing the vehicle to fold and unfoldable easily and greatly reducing the difficulty of operating the foldable vehicle so as to optimize the user experience of the foldable vehicle.

The foldable linkage includes a first linkage assembly with both ends hinged with the head assembly 100 and the front chassis 200 respectively and a second linkage assembly hinged with the first linkage assembly and the rear chassis 300, wherein the second linkage assembly can be driven to move by controlling the movement of the rear chassis 300 and can drive the first linkage assembly to move.

The first linkage assembly is driven by the second linkage assembly to control the relative movement between the head assembly 100 and the front chassis 200. When the second linkage assembly pulls the first linkage assembly towards the rear chassis 300, the head assembly 100 rotates relative to the front chassis 200 clockwise about the hinge axis of both to reach the foldable state of the foldable vehicle; when the second linkage assembly pushes the second linkage assembly towards the head assembly 100, the head assembly 100 rotates relative to the front chassis 200 counterclockwise about the hinge axis of both to reach the deployment state of the foldable vehicle.

Specifically, in the present embodiment, the first linkage assembly includes a first link 401 and a second link 402 that are hinged together, wherein one end of the first link 401 away from the second link 402 is hinged with the head assembly 100 and one end of the second link 402 away from the first link 401 is hinged with the front chassis 200.

The first link 401 is hinged with the head assembly 100 above a position where the head assembly 100 is hinged with the front chassis 200, and the movement of the first link 401 will push or pull the head assembly 100 to rotate around the hinge axis of the head assembly 100 and the front chassis 200; the first link 401 and the second link 402 are arranged so as to drive the movement of another first link 401 by pushing or pulling the second link 402 and further push or pull the head assembly 100 to turn around the hinge axis of the head assembly 100 and the front chassis 200 by the movement of the first link 401, thus realizing the foldable and unfoldable between the head assembly 100 and the front chassis 200 while the structure being simple and easy to operate.

The second linkage assembly according to the present embodiment includes a third link 403 and a fourth link 404 that are hinged together, wherein one end of the third link 403 away from the fourth link 404 is hinged at the position of the second link 402 adjacent to the first link 401 and one end of the fourth link 404 away from the third link 403 is hinged with the rear chassis 300.

The position mentioned above where the second link 402 is located close to the first link 401 means that the second link 402 is divided into two parts of equal length along the length direction of the second link 402, and the part close to the first link 401 may be a position where the third link 403 is hinged with the second link 402.

Arranging the position where the third link 403 is hinged with the second link 402 at the upper part of the second link 402 close to the first link 401 is based on the resultant torque theorem in order to facilitate being forced when the second link 403 drives the second link 402 to move; at the same time, under the deployment state of the foldable vehicle, such hinged position can form a triangle structure with the position where the second link 402 is hinged with the front chassis 200 and the position where the third link 403 is hinged with the fourth link 404, which provides a stronger support for the second link 402; and also, compared with the multi-linkage used for foldable a plurality of parts in prior art, the foldable linkage greatly simplifies the structure of foldable vehicle and improves the structural stability of this vehicle to enhance the stability of foldable operations by realizing the linkage relationship among the head assembly 100, the front and rear chassis 200, 300 using four-linkage mechanism.

One end of the rear chassis 300 adjacent to the front chassis 200 is arranged with a hinge connection member 407 and the fourth link 404 is hinged with the rear chassis 300 by the hinge connection member 407. The purpose of providing the hinge connection member 407 is to make the connecting position of the fourth link 404 and the rear chassis 300 avoid the hinge axis of the front chassis 200 and the rear chassis 300 as much as possible such that the rear chassis 300 can have enough rotating arms to drive the fourth link 404 to swing as large as possible during the control of the rotation of the front chassis 200 relative to the rear chassis 300 in order to achieve driving the foldable linkage to swing as a whole, thereby controlling the foldable and deployment of the foldable vehicle.

In order to control the moving direction of the third link 403 during foldable and deployment, in the present embodiment, the front chassis 200 is arranged with a slider slidable relative to the front chassis 200 and the third and fourth link 403, 404 are hinged with the slider by a common hinge axis so that the stability for the movement and accuracy for the trajectory of the third link 403 is ensured, further, the accuracy for the trajectory of the second and first link 402, 401 is ensured, thus ensuring realization of the foldable or deployment.

Preferably, the front chassis 200 is arranged with a sliding slot 405 and the slider is a sliding block 406 arranged slidably in the sliding slot 405. During the deployment or foldable process, one end of the third link 403 and the fourth link 404 hinged to each other always slides in the sliding slot 405 such that the accuracy for the trajectory of the foldable linkage is ensured and realization of foldable or deployment is ensured.

In order to facilitate the control of the foldable linkage, in this embodiment, a handle 410 is provided on the rear chassis 300 adjacent to the position where the rear chassis 300 is hinged with the front chassis 200. The handle 410 is hinged to the rear chassis 300. The handle 410 is hinged with the rear chassis 300. However, the handle 410 can drive the rear chassis 300 to rotate relative to the front chassis 200 when the handle 410 rotates to a certain degree relative to the rear chassis 300, and the foldable linkage is driven to move by the hinge connection member 407 arranged on the rear chassis 300.

Preferably, a deployment fixing groove 408 is arranged at both ends of the handle 410 and adjacent to the one side of the rear chassis 300 and the front chassis 200 is arranged with a stop block 409 at a position corresponding to the deployment fixing groove 408; the stop block 409 abuts against the handle 410 at the deployment fixing groove 408 when the foldable vehicle is in a deployment state. In the present embodiment, the pressure angle is exactly equal to 90° when the handle 410 and the stop block 409 are pressed against each other through arranging the deployment fixed groove 408 and stop block 409, and the front chassis 200 and the rear chassis 300 are locked in the dead center position.

Further, in the present embodiment, the foldable linkage has two groups and symmetrically arranged on both sides of the foldable vehicle.

Two groups of the foldable linkage perform exactly the same synchronization action during the foldable, deployment of the foldable vehicle. When the foldable linkage is set as two groups, the foldable vehicle can be forced and balanced during the foldable and deployment, so as to avoid the phenomenon that the foldable linkage deforms and causes the jamming.

In order to lock the upper head 110 with the lower head 120 after foldable through the head locking assembly, specifically, the head locking assembly includes a head latch hook arranged on the upper head 110 or the lower head 120 and a head bottom buckle 121 arranged on the upper head 110 or the lower head 120 corresponding to the head latch hook, wherein the head latch hook is arranged symmetrically with the head bottom buckle 121 relative to a hinge axis of the upper head 110 and the lower head 120.

The arranging positions of the head latch hook and the head bottom buckle 121 are interchangeable upon realizing the locking of the upper head 110 with the lower head 120. However, in order to facilitate controlling on the head latch hook, in the preferred scheme of the present embodiment, the head latch hook is arranged on the upper head 110 and the head bottom buckle 121 is arranged on the lower head 120.

As a preferred technical solution for the foldable vehicle, the head latch hook includes a head latch hook body 111 and an elastic connector 112 used for connecting the head latch hook body 111 with the foldable vehicle, wherein the head latch hook body 111 is swingable relative to the foldable vehicle under the connection of the elastic connector 112. The head latch hook body 111 includes a head hook facing the head bottom buckle 121 and a head unlocking button 113 arranged on one end of the head latch hook body 111 away from the head hook, wherein the head unlocking button can control the swing of the head latch hook body. The head unlocking button 113 can control the swinging of the head latch hook body 111 so that the head latch hook body 111 is stuck into and separated from the head bottom buckle 121 and further, the foldable and unlocking between the upper head 110 and the lower head 120 are achieved, thereby simplifying the structure of foldable mechanism so as to simplify the foldable operations between the upper head 110 and the lower head 120.

Of course, the upper head 110 can be also provided with a group of magnets and the lower head 120 with a group of magnets, wherein the two groups of magnets are symmetrically arranged relative to the hinge axis of the upper and lower head and can be attracted to each other when the upper head moves close to the lower head after foldable. It further realizes the foldable and unlocking between the upper head 110 and the lower head 120. This solution gives up partial locking strength, but more simplifies the foldable operation of the upper head 110 and the lower head 120.

And also, in the embodiments of the present invention, the chassis locking assembly includes a chassis latch hook, a chassis locking buckle 201 corresponding to the chassis latch hook, an elastic support 302 used to push the chassis latch hook to move towards the chassis locking buckle 201; the whole vehicle locking assembly includes a whole vehicle latch hook, a whole vehicle locking buckle 122 corresponding to the whole vehicle latch hook, an elastic support 302 used to push the whole vehicle latch hook to move towards the whole vehicle locking buckle 122. The chassis latch hook includes a chassis latch hook body 301 hinged on the rear chassis 300, and the elastic support 302 is arranged at one end of the chassis latch hook body 301 to push the chassis latch hook body 301 to rotate around the hinge axis while the other end of the chassis latch hook body 301 is connected with a linkage unlocking rod 304; the whole vehicle latch hook includes a whole vehicle latch hook body 303 hinged on the rear chassis 300, and the elastic support 302 is arranged at one end of the whole vehicle latch hook body 303 to push the whole vehicle latch hook body 303 to rotate around the hinge axis while the other end of the whole vehicle latch hook body 303 is connected similarly with the linkage unlocking rod 304; the linkage unlocking rod 304 synchronously controls the chassis latch hook body 301 and the whole vehicle latch hook body 303 so as to push the chassis latch hook body 301 to push the chassis latch hook body 301 to rotate around the hinge axis by the action of the elastic support 302, and simultaneously to push the whole vehicle latch hook body 303 to rotate around the hinge axis so that the chassis latch hook body 301 arranged on the rear chassis 300 is buckled with the chassis locking buckle 201 arranged on the rear chassis 200 and so that the whole vehicle latch hook body 303 arranged on the rear chassis 300 is buckled with the whole vehicle buckle position arranged on the lower head 120. Both the chassis latch hook body 301 and the whole vehicle latch hook body 303 are connected with the linkage unlocking rod 304 so as to drive the movement of both by the movement of the linkage unlocking rod 304 and further to achieve the synchronous movement of both, that is, to realize the simultaneous unlocking of the chassis locking assembly and the whole vehicle locking assembly, thus simplifying the structure and facilitating operation. Compared with the separate locking between the head and chassis, the front and rear chassis in the prior art, above solution greatly simplifies its cumbersome operation.

In the present embodiment, the elastic support 302 employs a compression spring.

Specifically, the rear chassis 300 is provided with a support member mounting plate 305 thereon used to mount the elastic support 302; the support member mounting plate 305 has two plates, and the two support member mounting plates 305 are parallel with each other for mounting the compression spring pushing the chassis latch hook body 301 and for mounting the compression spring pushing the whole vehicle latch hook body 303.

Figure 8:
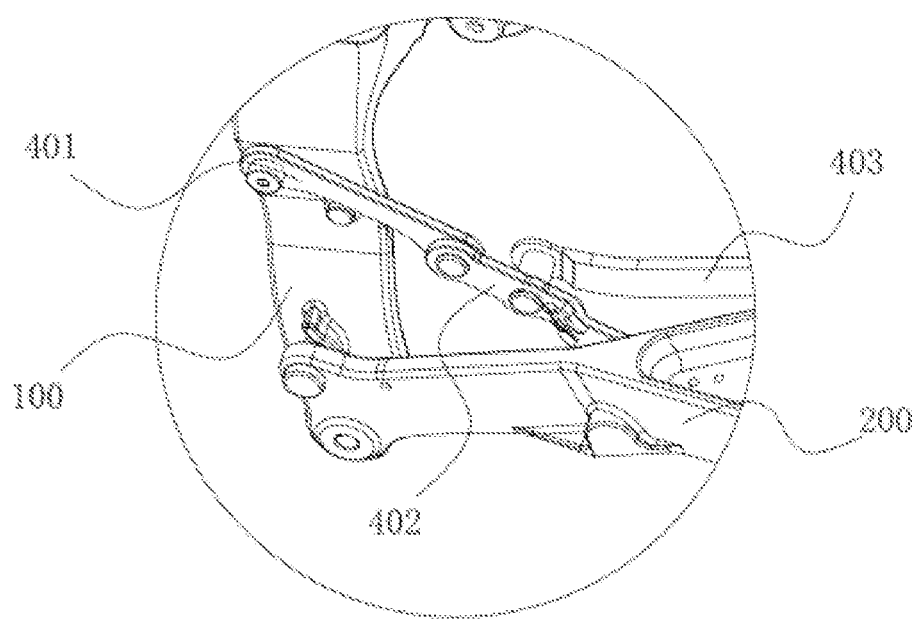
FIG. 8 is an enlarged view of III in FIG. 7.
Figure 9:
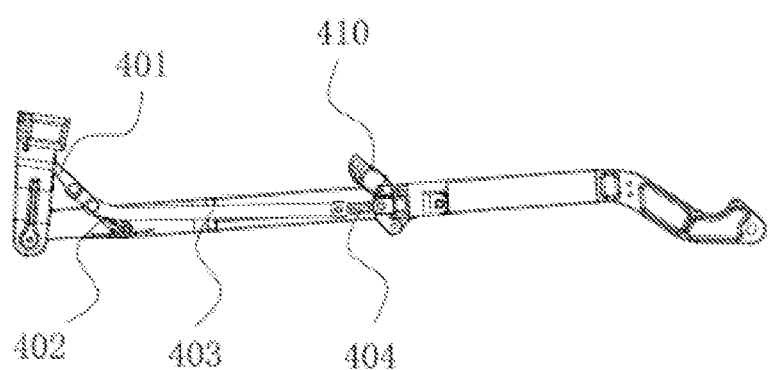
FIG. 9 is a structural view of the foldable linkage mounted in the foldable vehicle, according to embodiments.
Figure 10:
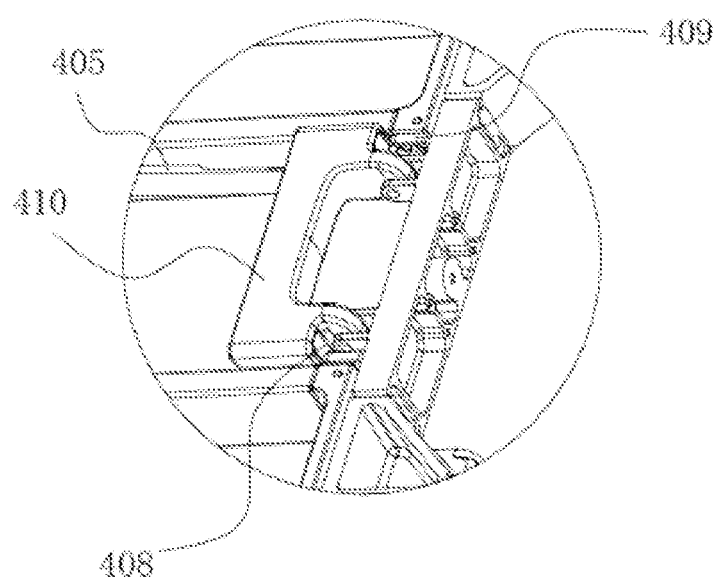
FIG. 10 is a partially enlarged view of the connecting position between the front and rear chassis, according to embodiments.
Figure 11:
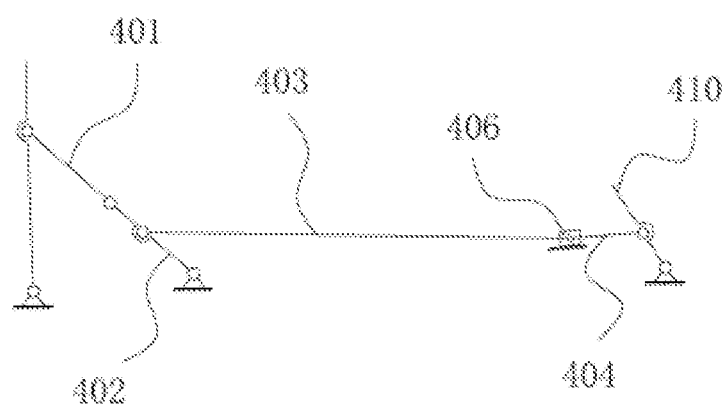
FIG. 11 is a schematic diagram for the deployment state of the foldable linkage, according to embodiments.
Figure 12:
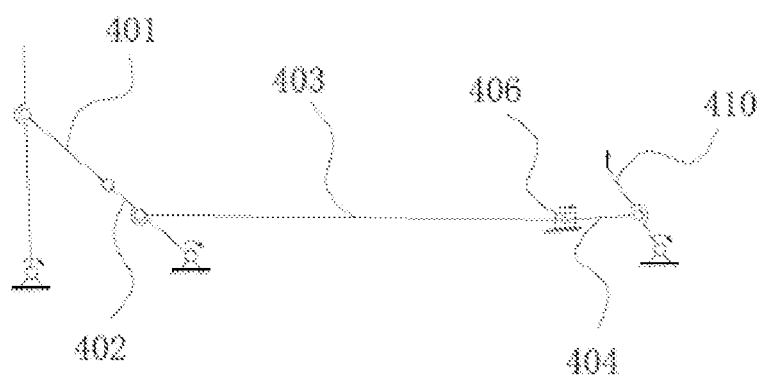
FIG. 12 is a schematic view for the moving direction of the foldable linkage, according to embodiments (the direction of the arrow in the figure is the moving direction of each link)
Figure 13:
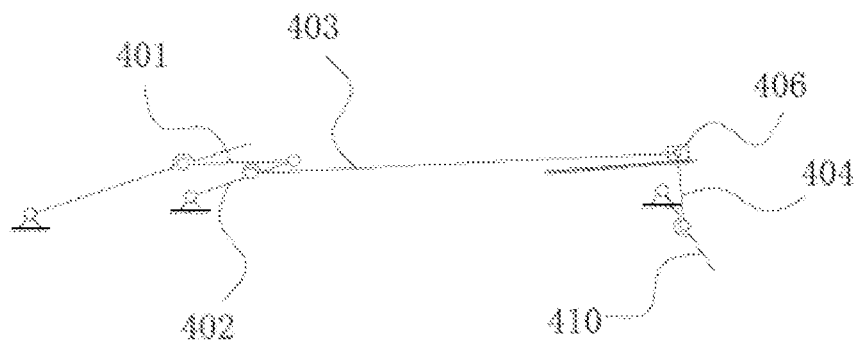
FIG. 13 is a schematic diagram for the foldable state of the foldable linkage, according to embodiments.
Figure 14:
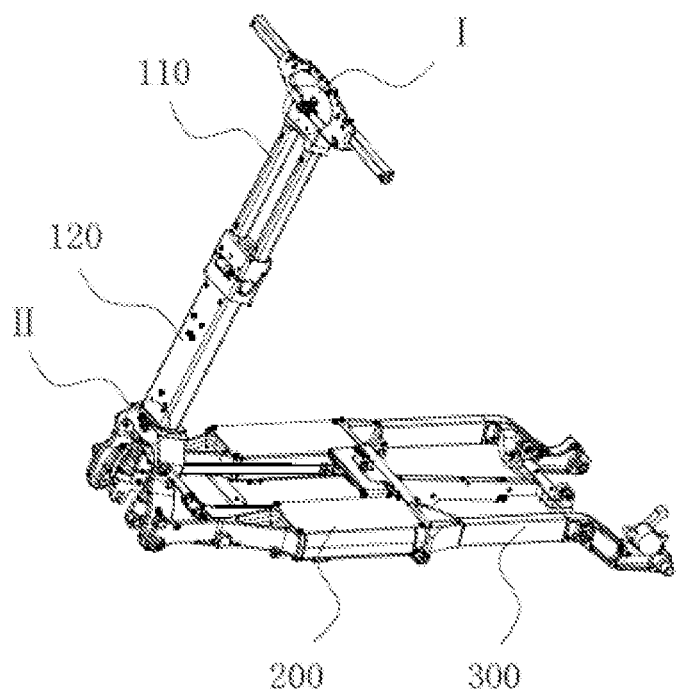
FIG. 14 is a three-dimensional structure diagram of the foldable vehicle having the foldable vehicle lock according to embodiments.
Figure 15:
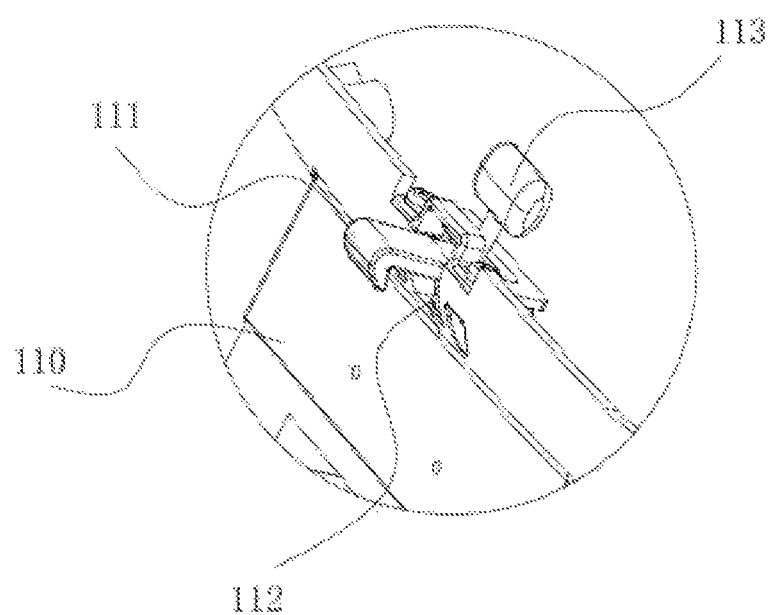
FIG. 15 is an enlarged view of I in FIG. 14.
Figure 16:
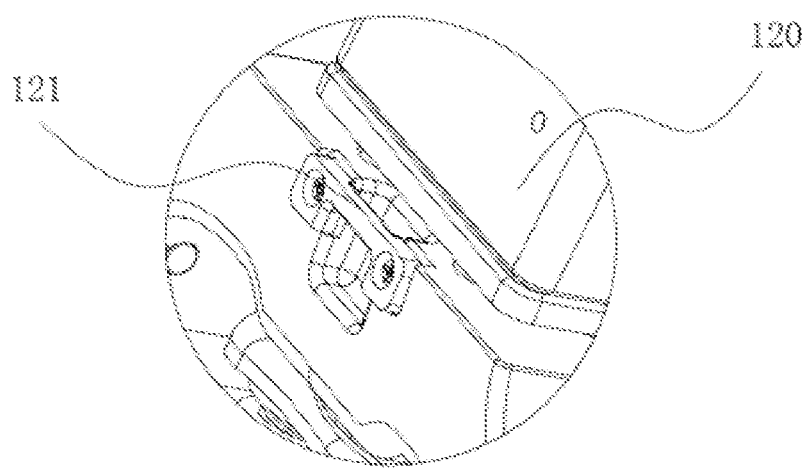
FIG. 16 is an enlarged view of II in FIG. 14.
Figure 17:
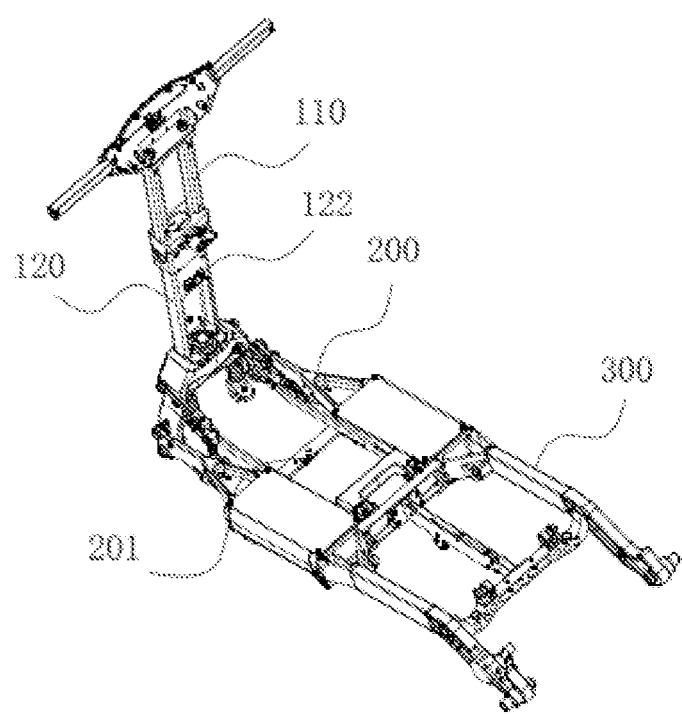
FIG. 17 is another three-dimensional structure diagram of the foldable vehicle having the foldable vehicle lock according to embodiments.
Figure 18:
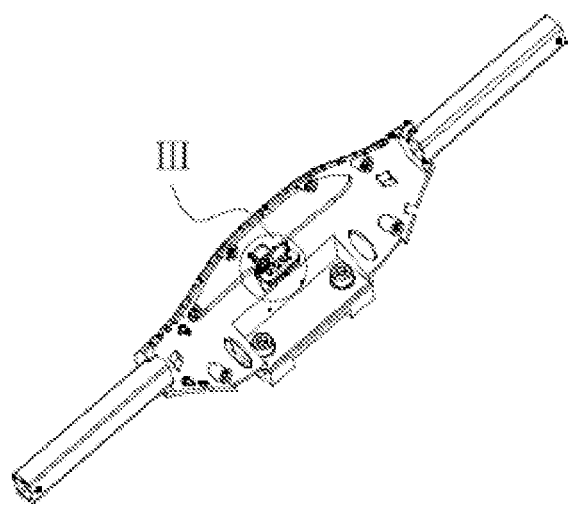
FIG. 18 is a three-dimensional structure diagram for the head assembly of the foldable vehicle according to embodiments.
Figure 19:
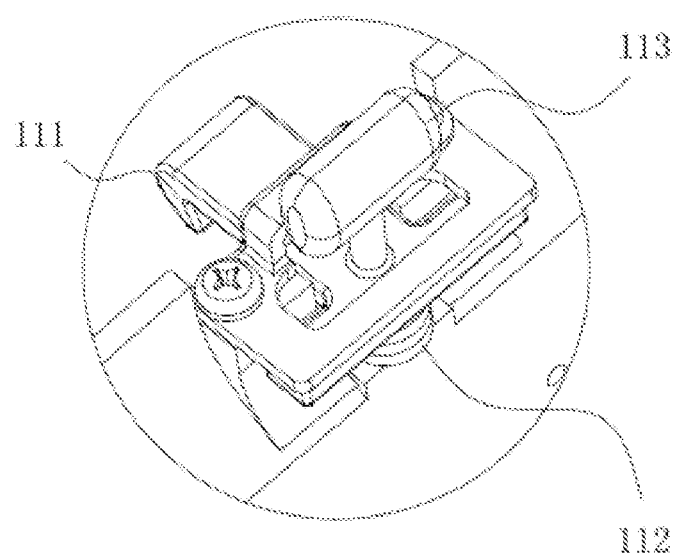
FIG. 19 is an enlarged view of III in FIG. 18.
Figure 20:
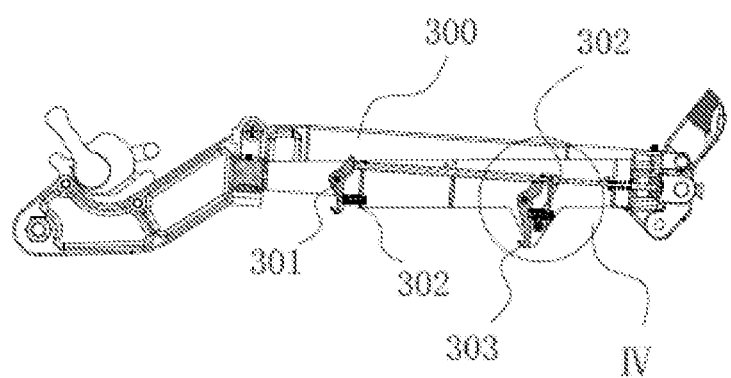
FIG. 20 is a section view of the rear chassis according to embodiments.
Figure 21:
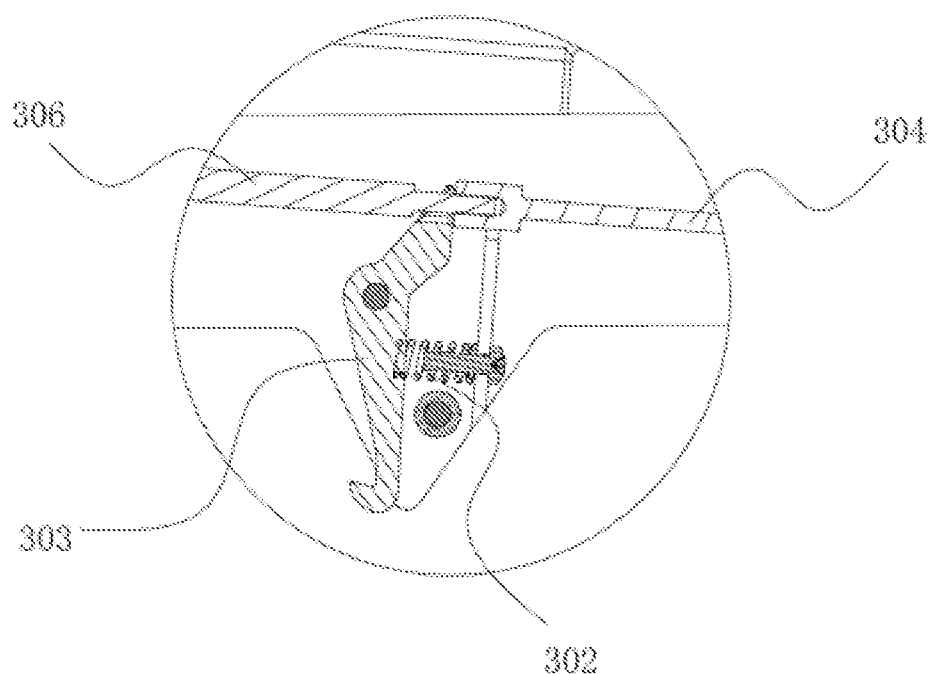
FIG. 21 is an enlarged view of IV in FIG. 20.
Figure 22:
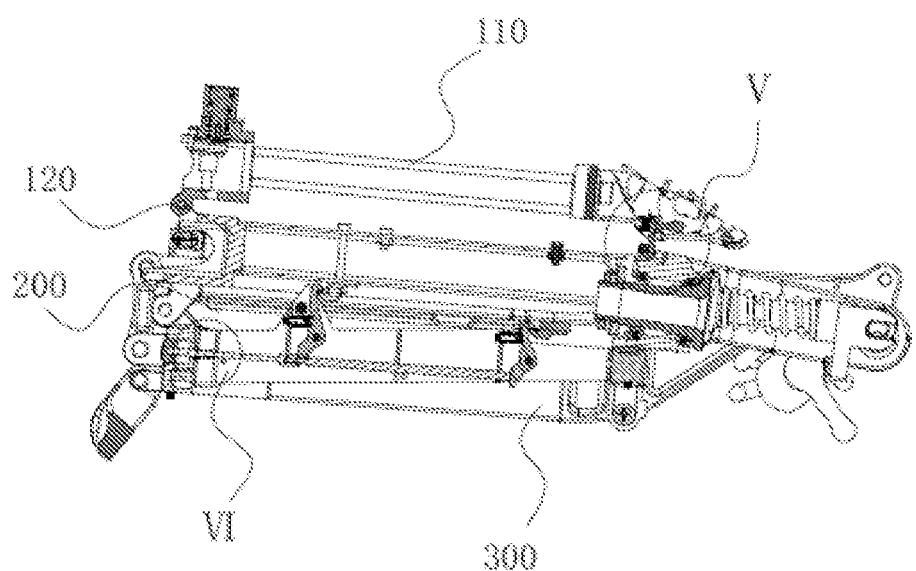
FIG. 22 is a section view for the locking state of the foldable vehicle according to embodiments.
Figure 23:
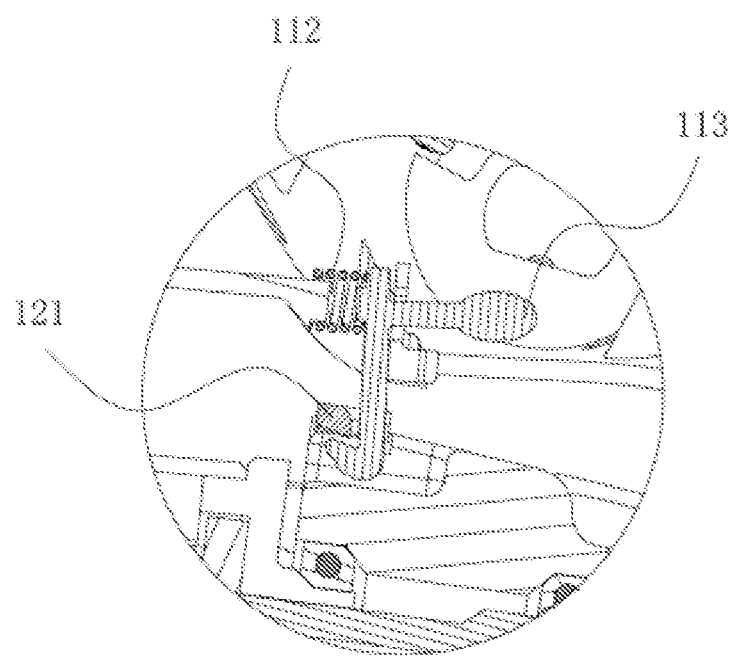
FIG. 23 is an enlarged view of V in FIG. 22.
Figure 24:
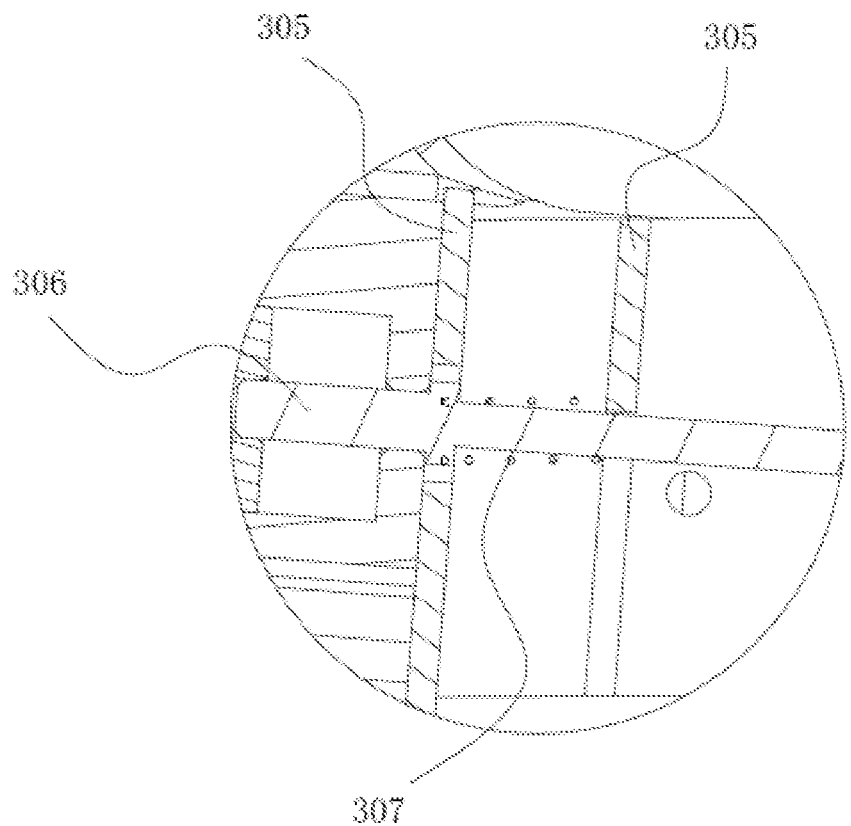
FIG. 24 is an enlarged view of VI in FIG. 22.
Figure 25:
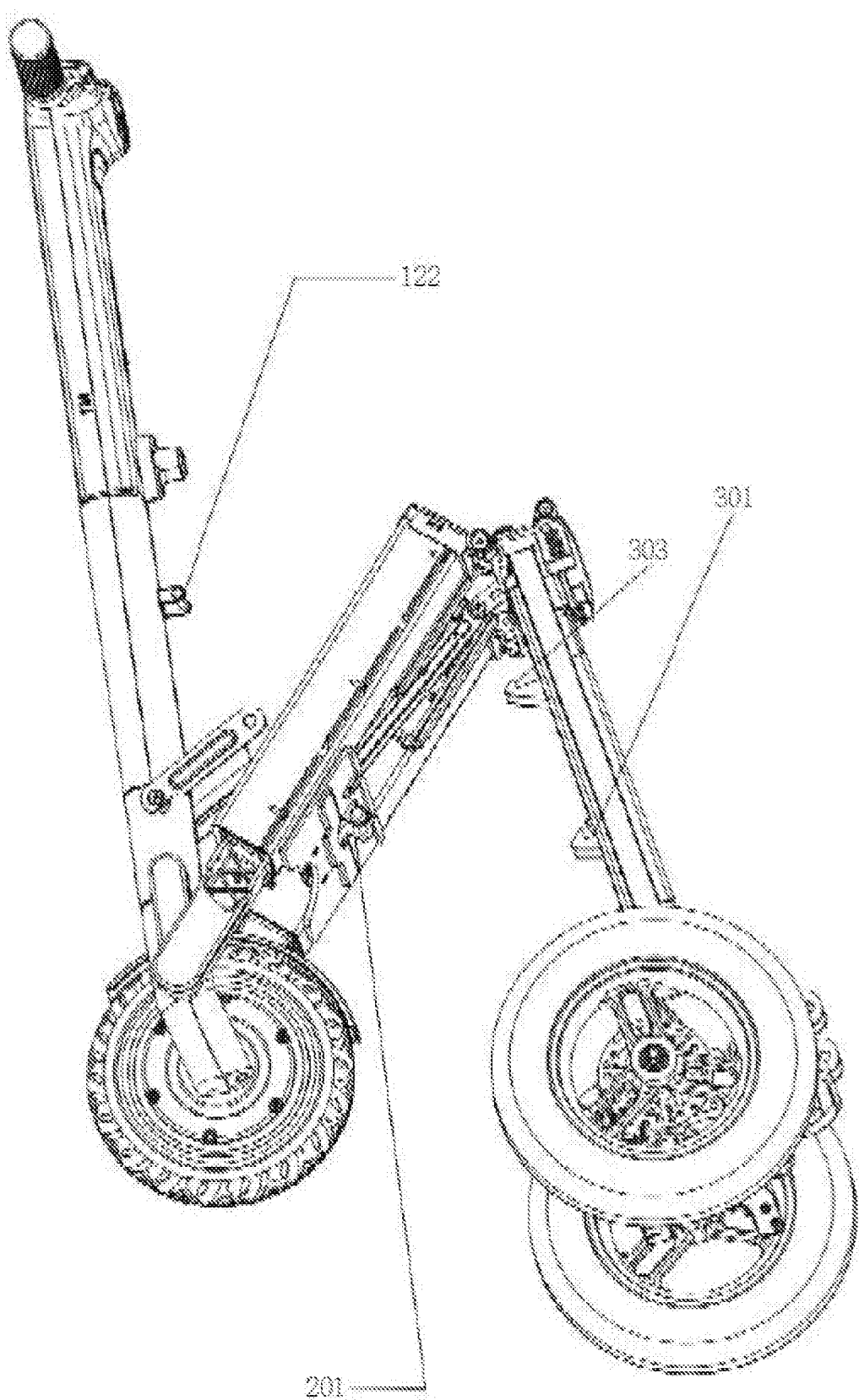
FIG. 25 is a side schematic view for the intermediate state during the foldable of the foldable vehicle having the foldable vehicle lock according to embodiments.
Figure 26:
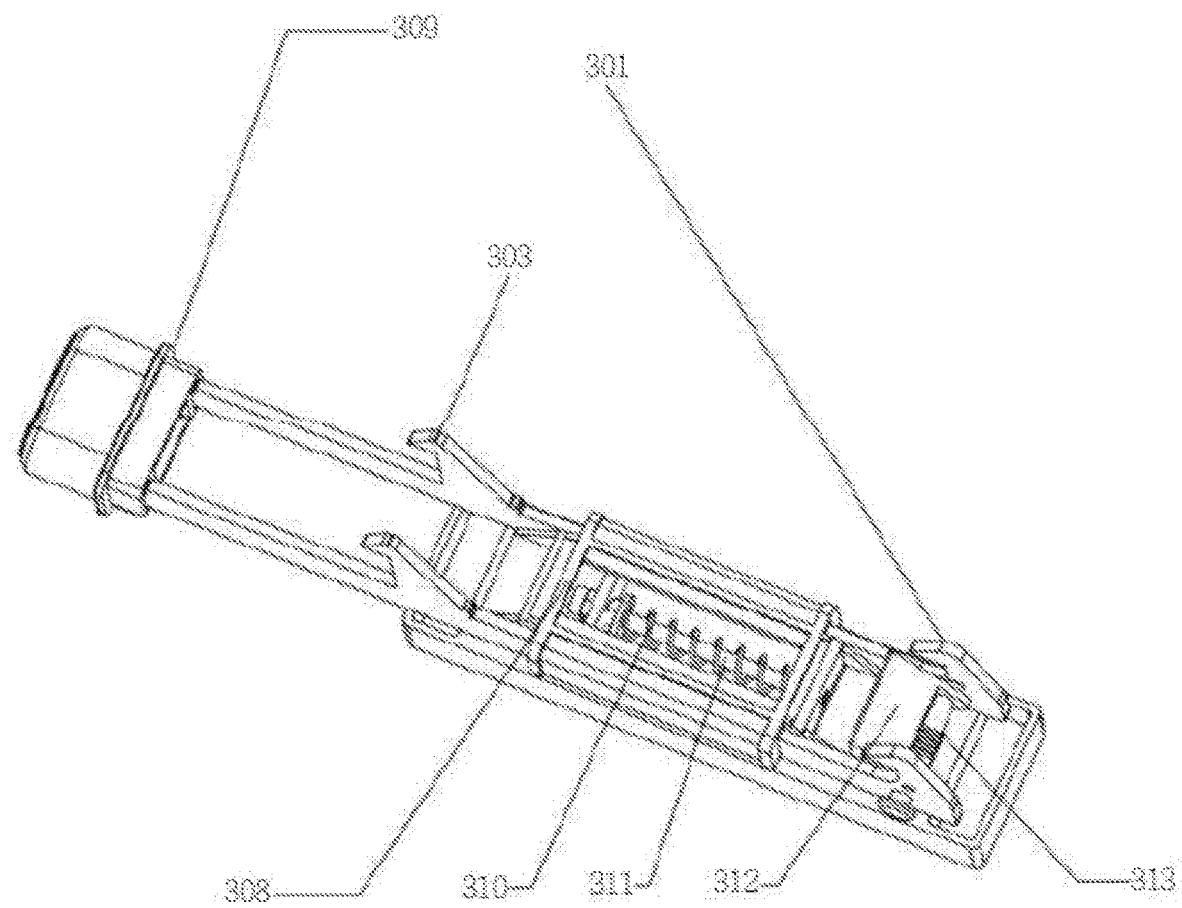
FIG. 26 is a structural diagram for the chassis latch hook body and the whole vehicle latch hook body in the foldable vehicle having the foldable vehicle lock according to embodiments.
Figure 27:
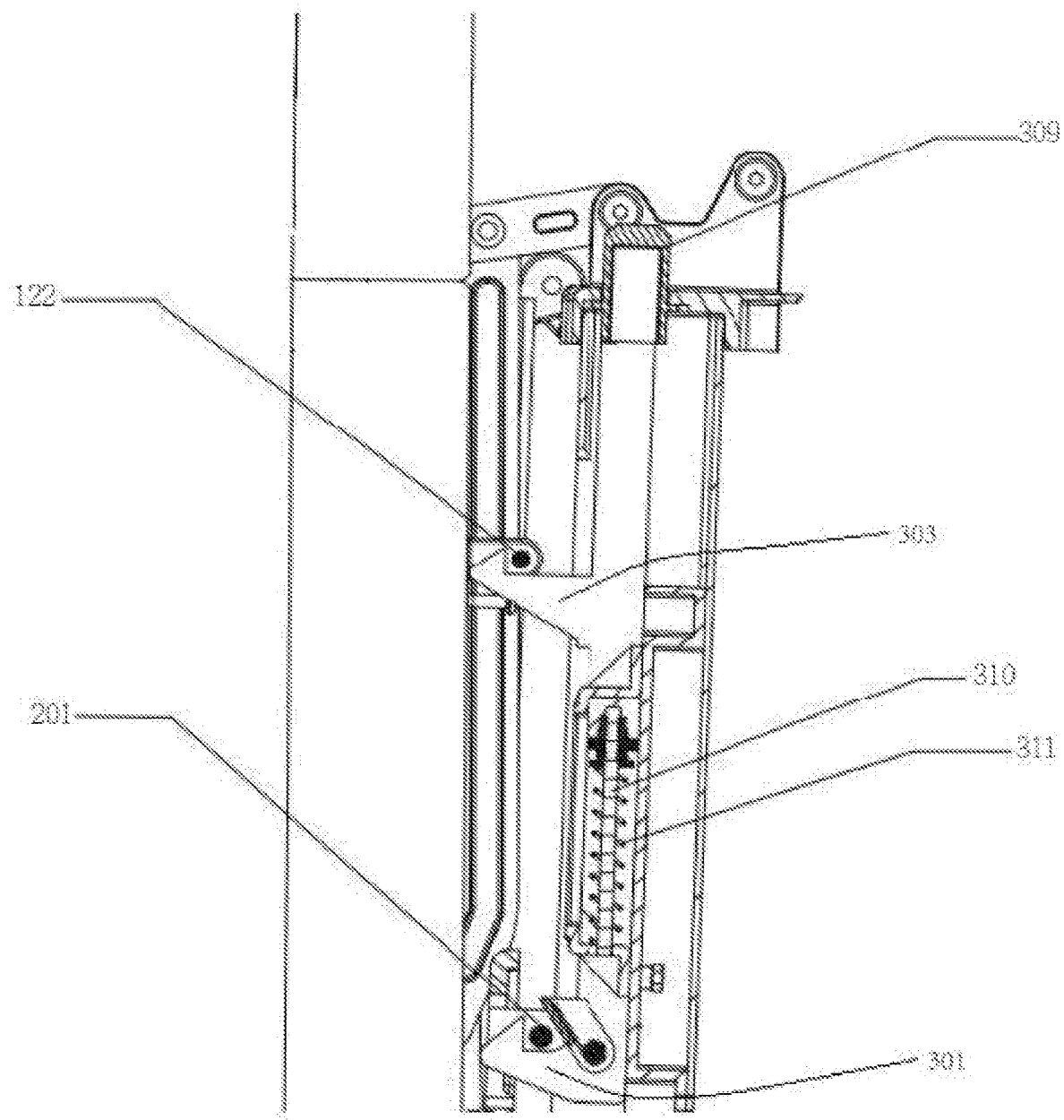
FIG. 27 is a structural diagram for the foldable vehicle having the foldable vehicle lock according to embodiments in which the chassis latch hook body is locked with the whole vehicle latch hook body.
Figure 28:
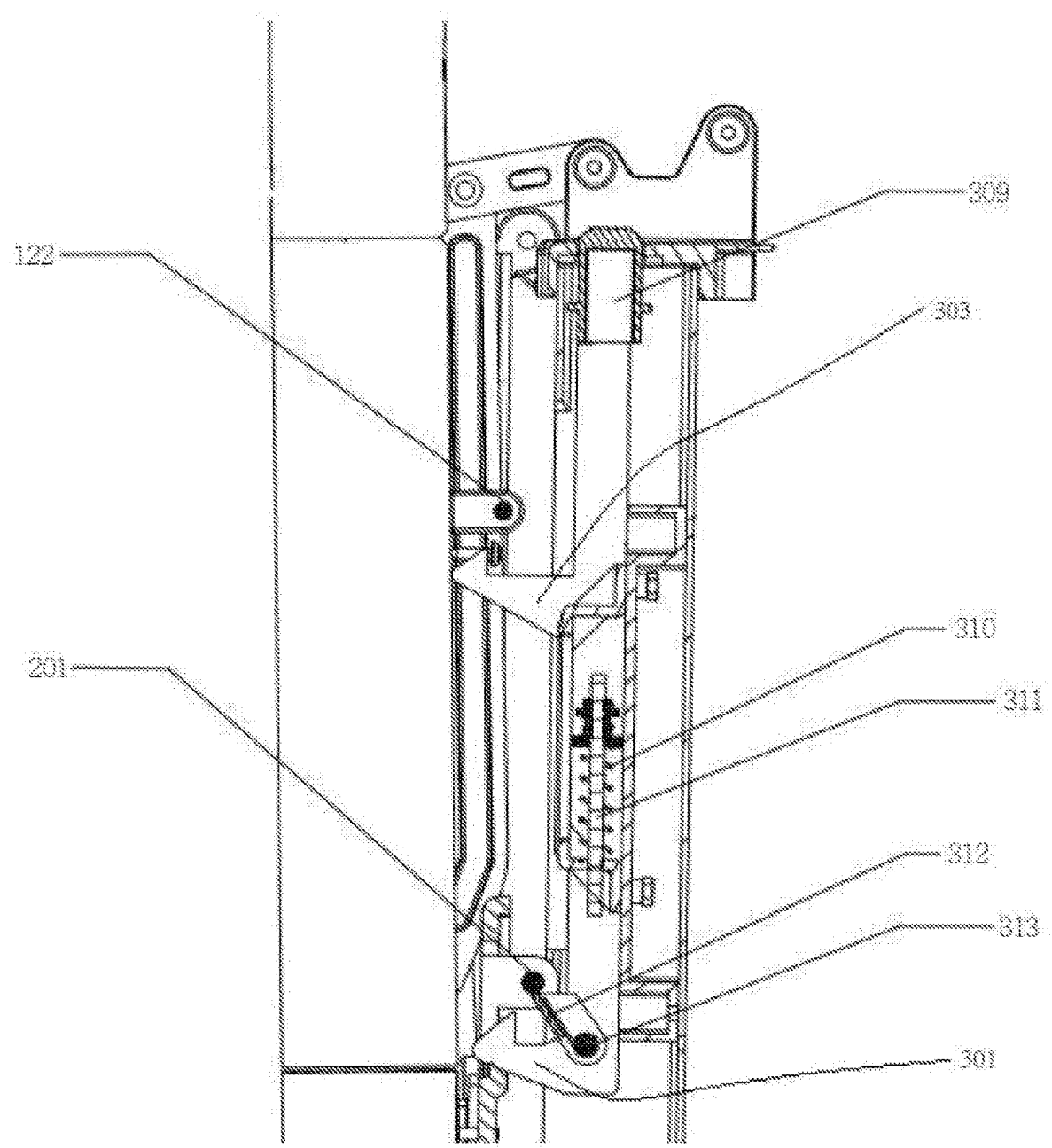
FIG. 28 is a structural diagram for the foldable vehicle having the foldable vehicle lock according to embodiments in which the chassis latch hook body is unlocked with the whole vehicle latch hook body.

In order to achieve the linking control on the locking mechanism of the foldable vehicle, in a specific solution provided by the present embodiment, as shown in FIGS. 8 and 11, the end of the linkage unlocking rod 304 is connected with an unlocking control rod 306, wherein the unlocking control rod 306 is arranged with a return spring 307 capable of allowing the unlocking control rod 306 to automatically reset after being pressed so as to automatically lock when foldable the foldable vehicle subsequently, and further to avoid the manual resetting and locking in subsequent foldables, thus facilitating use.

The unlocking control rod 306 has an annular boss thereon and the rear chassis 300 is arranged with a first control rod mounting plate and a second control rod mounting plate that are parallel to each other; the return spring 307 is sleeved on the unlocking control rod 306, and both the return spring 307 and the annular boss are positioned between the first control rod mounting plate and the second control rod mounting plate; the return spring 307 is arranged at one side of the annular boss adjacent to the linkage unlocking rod 304 so as to improve the structural stability of the vehicle and further to ensure the stability of movement and resetting of the unlocking control rod 306 and the linkage unlocking rod 304 driven by the return spring 307 while avoiding the arbitrary foldable and unlocking of the foldable vehicle resulted from the movement of the unlocking control rod 306 caused by inadvertent collision and misuse.

An end of the unlocking control rod 306 connecting with the linkage unlocking rod 304 is arranged with a threaded hole, and the linkage unlocking rod 304 is in threaded connection with the unlocking control rod 306.

Of course, the connecting manner of the unlocking control rod 306 with the linkage unlocking rod 304 is not limited to above manner, for example it may be a manner of hinged connection in other embodiments.

Of course, in the embodiments of the present invention, the chassis latch hook and the whole vehicle latch hook can be controlled in a linking manner by other structures. As shown in FIGS. 25-28, the chassis latch hook includes a chassis latch hook body 301 and the whole vehicle latch hook includes a whole vehicle latch hook body 303, wherein the chassis latch hook body 301 is securely connected with the whole vehicle latch hook body 303 and is slidably connected with the rear chassis 300.

Specifically, the chassis latch hook body 301 and the whole vehicle latch hook body 303 are in a parallel arrangement, or may be integrally formed or connected with each other by welding. In order to achieve the sliding of the chassis latch hook body 301 and the whole vehicle latch hook body 303, the chassis latch hook body 301 and/or the whole vehicle latch hook body 303 is connected slidably with the rear chassis 300 by the latch hook sliding base 308. However, in order to avoid the volume of the vehicle after foldable, in the preferred solution of the present embodiment, the latch hook sliding base 308 is arranged on the rear chassis 300 and the chassis latch hook slides along the latch hook sliding base 308 to drive the whole vehicle latch hook to slide relative to the rear chassis 300 so as to achieve the snap-in and unlocking between the chassis latch hook body 301 and the whole vehicle locking buckle 122, and the whole vehicle latch hook body 303 and the chassis locking buckle 201.

To facilitate the operation and control between the chassis latch hook body 301 and the whole vehicle latch hook body 303, the chassis latch hook further includes a linkage unlocking button 309 arranged in the chassis latch hook body 301 or the whole vehicle latch hook body 303 further includes a linkage unlocking button 309 arranged in the whole vehicle latch hook body 303, wherein the linkage unlocking button 309 can control the sliding of the chassis latch hook body 301 and the whole vehicle latch hook body 303.

To achieve control on the sliding of the chassis latch hook body 301 and the whole vehicle latch hook body 303, the linkage unlocking button 309 is arranged on the chassis latch hook body 301 or the whole vehicle latch hook body 303. However, in order to improve the structural stability of the foldable vehicle, in the preferred solution of the present embodiment, the linkage unlocking button 309 is arranged on the whole vehicle latch hook body 303. Compared with this solution, when the linkage unlocking button is arranged on the chassis latch hook body 301, the chassis latch hook body 301 will pose its gravity onto the whole vehicle latch hook body 303 so that the stability for connection between the chassis latch hook body 301 and the whole vehicle latch hook body 303 is decreased.

In order to achieve the resetting of the chassis latch hook body 301 and the whole vehicle latch hook body 303, the elastic support includes a latch hook return spring 310 arranged on the latch hook sliding base 308 and a latch hook sliding guide post 311 arranged within the latch hook return spring 310; the whole vehicle latch hook is arranged with a fixed resilient tab 312 and a resilient tab return spring 313, wherein the fixed resilient tab 312 can be rotatably connected with the resilient tab return spring for fixing the chassis latch hook body 301 and the whole vehicle latch hook body 303, and the resilient tab return spring 313 is used for resetting the fixed resilient tab when the fixed resilient tab 312 rotates to a predetermined angle to reset the chassis latch hook body and the whole vehicle latch hook body through the latch hook return spring 310.

Specifically, after the linkage unlocking button 309 is pressed, the chassis latch hook body 301 and the whole vehicle latch hook body 303 slide downward to compress the latch hook return spring 310 on the latch hook sliding base 308 and to push the latch hook sliding guide post 311 to slide downward for further driving the fixed resilient tab 312 to rotate; when the chassis latch hook body 301 and the whole vehicle latch hook body 303 moves to a certain stroke, the resilient tab return spring 313 resets the fixed resilient tab 312 and the fixed resilient tab 312 fixes the chassis latch hook body 301 and the whole vehicle latch hook body 303 so that the unlocking between the head assembly 100 and the chassis assembly, and the front chassis 200 and the rear chassis 300 is further achieved, that is, the deployment of the foldable vehicle is realized and the chassis latch hook body 301 and the whole vehicle latch hook body 303 are reset under the action of the latch hook return spring 310 after deployment.

The following describes the process of deployment and foldable the foldable vehicle according to the present invention:

the process of foldable to lock:

When the foldable vehicle in a deployment state, i.e. when it is needed to deploy, the foldable vehicle is in the deployment state firstly, then the first link 401 and second link 402 are in a dead center position. At that time, an operator can use one hand to lift the handle 410 to drive the front chassis 200 and rear chassis 300 to rotate relative to each other (the rear chassis 300 rotates clockwise relative to the front chassis 200); the hinge connection member 407 arranged on the rear chassis 300 drives the fourth link 404 to swing, the fourth link 404 drives the third link 403 and the sliding block 406 to move in the sliding slot 405, and the end of the third link 403 hinged with the second link 402 swings to drive the second link 402 to rotate clockwise around the hinge axis of the second link and the front chassis 200 so that the first link 401 and the second link 402 leaves the dead center position. Then the first link 401 drives the head assembly 100 to rotate clockwise towards the front chassis 200. Continuing lifting the handle 410 until the whole vehicle reaches entirely deployment state, that is, when the front chassis 200 approaches to be parallel to the rear chassis 300, the head assembly 100 will move relative to the chassis assembly until to a closely-parallel position. Then the chassis latch hook body 301 arranged on the rear chassis 300 is buckled with the chassis locking buckle 201 arranged on the front chassis 200, and the whole vehicle latch hook body 303 arranged on the rear chassis 300 is buckled with the whole vehicle locking buckle arranged on the lower head 120. Finally, the locking of entire vehicle is achieved.

Controlling the rotation of the upper head 110 relative to the lower head 120, when the upper head 110 approaches to be parallel to the lower head 120, the head latch hook body 111 arranged on the upper head 110 contacts the head bottom buckle 121 arranged on the lower head 120 and the head bottom buckle 121 extrudes the head latch hook body 111 so that the elastic connector 112 is compressed to deform. After the head latch hook body 111 is snapped into the head bottom buckle 121, the elastic connector 112 applies an extrusion force on the head latch hook body 111 to ensure that the head latch hook body 111 abuts against the head bottom buckle 121.

process of deploying to unlock:

In the folded state as described above, the unlocking between the upper and lower head 110, 120 is achieved by extruding the head unlocking button 113 and pulling the upper head 110 and lower head 120 to separate from each other. At the same time, the unlocking control rod 306 is pressed to drive the linkage unlocking rod 304 or the linkage unlocking button 309 is pressed to drive the chassis latch hook body 301 and the chassis locking buckle to separate from each other, and to drive the whole vehicle latch hook body 303 and the whole vehicle locking buckle 122 to separate from each other, so that the unlocking for all the locking position of the vehicle is achieved. Then the operator grips the handle 410 with one hand and controls the head assembly 100 to rotate counterclockwise around the hinge axis of the head assembly 100 and the front chassis 200 with another hand. Following above operations, the handle 410 is pressed downward until the front chassis 200 is in the same plane with the rear chassis 300, and the first and second link 401, 402 restores to the dead center position. Then the deployment of the vehicle is completed. After deploying fully, the handle 410 is continuously pressed downward so that the stop block 409 fixed on the front chassis 200 cooperates with the deployment fixing groove 408 to extrude the handle 410, causing the front chassis 200 is locked relative to the rear chassis 300. Since the front chassis 200 and the rear chassis 300 are relatively moved about the same hinge, the front chassis 200 and the rear chassis 300 will locked with each other when the handle 410 and the stop block 409 are pressed against each other to lead the pressure angle to be exactly equal to 90° and both to be at the dead center position.

It should be noted that above specific implementations are merely preferred embodiments of the present invention and the applied technical principles. Any modifications or replacements that are easily conceived by those skilled in the art within the technical scope disclosed by the present invention should be covered by the protection scope of the present invention.

What is claimed is:

1. A foldable vehicle, comprising:
   a head assembly comprises an upper head and a lower head that are hinged together;
   a chassis assembly hinged together with the head assembly, the chassis assembly comprises a front chassis and a rear chassis that are hinged together;
   a foldable linkage to fold and unfold the foldable vehicle, the foldable linkage being hinged with the head assembly, the front chassis and the rear chassis;
   the head assembly, the front chassis and the rear chassis are driven to conduct a relative movement to perform corresponding folding and unfolding operations;
   a foldable vehicle lock comprises: a head locking assembly to lock the upper head with the lower head; a chassis locking assembly to lock the front chassis with the rear chassis after folding; and a whole vehicle locking assembly to lock the head assembly with the chassis assembly after folding;
   a linkage controller synchronously controls the chassis locking assembly and the whole vehicle locking assembly;
   a handle arranged on the rear chassis and adjacent to a hinged position of the rear chassis and the front chassis;
   a deployment fixing groove arranged at both ends of the handle and adjacent to one side of the rear chassis;
   wherein:
      the head locking assembly comprises: a head latch hook arranged on the upper head or the lower head, and a head bottom buckle arranged on an other of the upper head or the lower head corresponding to the head latch hook;
      the head latch hook is arranged symmetrically with the head bottom buckle relative to a hinge axis of the upper head and the lower head;
      the handle is hinged to the rear chassis;
      the front chassis is arranged with a stop block at a position corresponding to the deployment fixing groove; and
      the stop block abuts against the handle at the deployment fixing groove when the foldable vehicle is in an unfolded state.

2. The foldable vehicle in claim 1, wherein the head latch hook comprises a head latch hook body and an elastic connector to connect the head latch hook body with the foldable vehicle, the head latch hook body is swingable relative to the foldable vehicle under connection of the elastic connector.

3. The foldable vehicle in claim 2, wherein the head latch hook body comprises a head hook facing the head bottom buckle and a head unlocking button arranged on one end of the head latch hook body distal from the head hook, the head unlocking button is configured to control a swing of the head latch hook body.

4. The foldable vehicle in claim 1, wherein the upper head comprises a first plurality of magnets and the lower head comprises a second plurality of magnets, the first and second pluralities of magnets are symmetrically arranged relative to the hinge axis of the upper and lower head, and are attracted to each other when the upper head moves close to the lower head.

5. The foldable vehicle in claim 1, wherein the chassis locking assembly comprises a chassis latch hook, a chassis locking buckle corresponding to the chassis latch hook, and an elastic support configured to push the chassis latch hook towards the chassis locking buckle; and wherein the whole vehicle locking assembly comprises a whole vehicle latch hook, a whole vehicle locking buckle corresponding to the whole vehicle latch hook, and an elastic support configured to push the whole vehicle latch hook towards the whole vehicle locking buckle.

6. The foldable vehicle in claim 5, wherein:
   the chassis latch hook comprises a chassis latch hook body hinged on the rear chassis;
   the elastic support of the chassis locking assembly is arranged at a first end of the chassis latch hook body to rotate the chassis latch hook body around a hinge axis while a second end of the chassis latch hook body is connected to a linkage unlocking rod;
   the whole vehicle latch hook comprises a whole vehicle latch hook body hinged on the rear chassis;
   the elastic support of the whole vehicle locking assembly is arranged at a first end of the whole vehicle latch hook body to rotate the whole vehicle latch hook body around the hinge axis while a second end of the whole vehicle latch hook body is connected to the linkage unlocking rod; and
   the linkage unlocking rod synchronously controls the chassis latch hook body and the whole vehicle latch hook body.

7. The foldable vehicle in claim 6, wherein the linkage unlocking rod is connected to an unlocking control rod, the unlocking control rod is arranged with a return spring configured to enable the unlocking control rod to automatically regroup after being pressed.

8. The foldable vehicle in claim 7, wherein:
   the unlocking control rod has an annular boss thereon;
   the rear chassis is arranged with a first control rod mounting plate and a second control rod mounting plate that are parallel to each other;
   the return spring is sleeved on the unlocking control rod;
   both the return spring and the annular boss are positioned between the first control rod mounting plate and the second control rod mounting plate; and
   the return spring is arranged at one side of the annular boss adjacent to the linkage unlocking rod.

9. The foldable vehicle in claim 7, wherein an end connecting the unlocking control rod to the linkage unlocking rod is arranged with a threaded hole; and wherein the linkage unlocking rod is in a threaded connection with the unlocking control rod.

10. The foldable vehicle in claim 5, wherein the chassis latch hook comprises a chassis latch hook body; wherein the whole vehicle latch hook comprises a whole vehicle latch hook body; and wherein the chassis latch hook body is securely connected to the whole vehicle latch hook body and is slidably connected to the rear chassis.

11. The foldable vehicle in claim 10, wherein the chassis latch hook body is integrally formed with the whole vehicle latch hook body; and wherein at least one of the chassis latch hook body and the whole vehicle latch hook is slidably connected to the rear chassis by a latch hook sliding base.

12. The foldable vehicle in claim 11, wherein:
each of the elastic supports of the chassis locking assembly and the whole vehicle locking assembly comprises a latch hook return spring arranged on the latch hook sliding base, and a latch hook sliding guide post arranged within the latch hook return spring;
the whole vehicle latch hook is arranged with a fixed resilient tab and a resilient tab return spring;
the fixed resilient tab is configured to be rotatably connected to the resilient tab return spring; and
the resilient tab return spring is configured to reset the fixed resilient tab upon a rotation of the fixed resilient tap to a predetermined angle to secure the chassis latch hook body to the whole vehicle latch hook body.

13. The foldable vehicle in claim 10, wherein the chassis latch hook further comprises an unlocking button arranged on the chassis latch hook body; wherein the whole vehicle latch hook body further comprises an unlocking button arranged on the whole vehicle latch hook body; and wherein the head locking assembly comprises a head unlocking button configured to control a sliding of the chassis latch hook body and the whole vehicle latch hook body.

14. The foldable vehicle in claim 1, wherein the foldable linkage comprises a first linkage assembly with both ends hinged with the head assembly and the front chassis, respectively, and a second linkage assembly hinged to the first linkage assembly and the rear chassis; and wherein the second linkage assembly is configured to be driven to move by controlling a movement of the rear chassis and configured to drive the first linkage assembly to move.

15. The foldable vehicle in claim 14, wherein the first linkage assembly comprises a first link and a second link that are hinged together, one end of the first link distal from the second link is hinged to the head assembly, and one end of the second link distal from the first link is hinged to the front chassis.

16. The foldable vehicle in claim 15, wherein the second linkage assembly comprises a third link and a fourth link that are hinged together, one end of the third link distal from the fourth link is hinged at a position of the second link adjacent to the first link, and one end of the fourth link distal from the third link is hinged to the rear chassis.

17. The foldable vehicle in claim 16, wherein one end of the rear chassis adjacent to the front chassis is arranged with a hinge connector; and wherein the fourth link is hinged to the rear chassis by the hinge connector.

18. The foldable vehicle in claim 17, wherein the front chassis is arranged with a slider configured to slide relative to the front chassis; and wherein the third link and the fourth link are hinged to the slider by a common hinge axis.

19. The foldable vehicle in claim 18, wherein the front chassis is arranged with a sliding slot; and wherein the slider is a sliding block arranged slidably in the sliding slot.

20. The foldable vehicle in claim 1, further comprising two foldable linkages, each foldable linkage symmetrically arranged on one of two sides of the foldable vehicle.

* * * * *